TADAO OOTSUKI,
TADAKATSU FUKUI,
YOSHIAKI NAKAHARA, and
SEISAKU ASADA,
Inventors

By Wenderoth, Lind
and Ponack Attorneys

TADAO OOTSUKI,
TADAKATSU FUKUI,
YOSHIAKI NAKAHARA, &
SEISAKU ASADA,

*Inventors*

By Wenderoth, Lind
and Ponack *Attorneys*

TADAO OOTSUKI,
TADAKATSU FUKUI,
YOSHIAKI NAKAHARA, &
SEISAKU ASADA,
*Inventors*

Oct. 12, 1971   TADAO OOTSUKI ET AL   3,611,507
PRODUCTION OF WORSTED TOPS
Filed Aug. 18, 1969                    6 Sheets-Sheet 6
FIG. 11
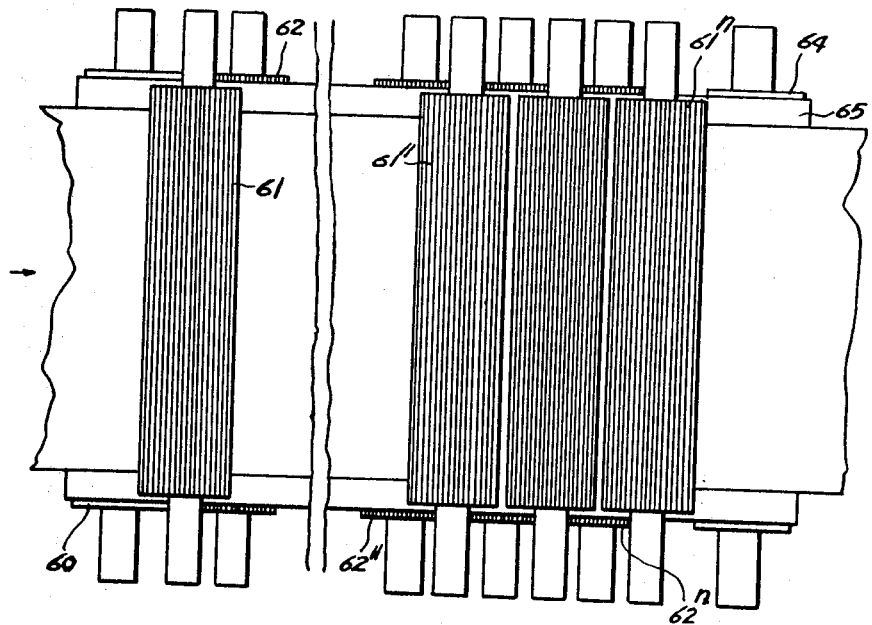
FIG. 10
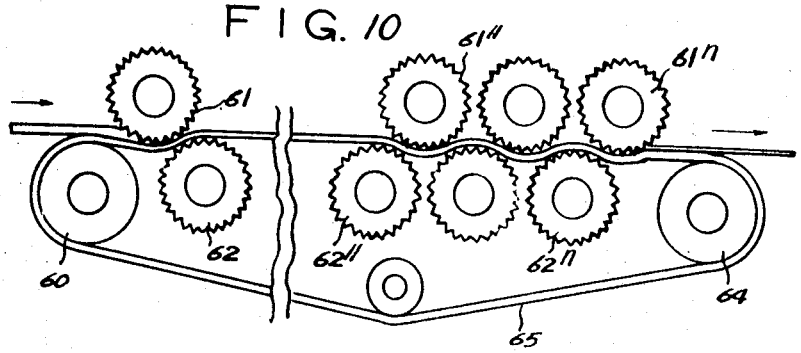
FIG. 12A
PRIOR ART
FIG. 12B
TADAO OOTSUKI,
TADAKATSU FUKUI,
YOSHIAKI NAKAHARA, &
SEISAKU ASADA,
            Inventors
By Wenderoth Lind
and Ponack  Attorneys

United States Patent Office

3,611,507
Patented Oct. 12, 1971

3,611,507
PRODUCTION OF WORSTED TOPS
Tadao Ootsuki, Tadakatsu Fukui, Yoshiaki Nakahara, and Seisaku Asada, Hikone, Japan, assignors to Kanegafuchi Boseki Kabushiki Kaisha, Tokyo, Japan
Filed Aug. 18, 1969, Ser. No. 850,940
Claims priority, application Japan, Aug. 22, 1968, 43/60,075
Int. Cl. D01b 3/04
U.S. Cl. 19—66    1 Claim

ABSTRACT OF THE DISCLOSURE

Worsted tops are produced by washing, drying and storing a wool material in a wool bin, then conveying it from the wool bin to cards, thereby carding it to form slivers. The slivers are then conveyed to first draft means, thereby drafting them, backwashed and then dried, gilled by a back after-gill, drafted by second draft means, and combed by combers. The combed slivers are then conveyed to shuffling means, thereby shuffling them and finally gilled by a high speed gill, thus forming worsted tops.

---

This invention relates to a method of producing tops of a wool material passed through a washing process, dried and conveyed to a wool bin in the worsted spinning system, and also to an apparatus therefor.

An object of the invention is to provide a novel and effective method and apparatus for producing tops of good quality while reducing the number of processes without losing the inherent characteristics of wool.

Another object of the invention is to reduce the costs of production of tops by greatly reducing the number of operators with inexpensive equipment used.

A further object of the invention is to increase the efficiency of production by abolishing intersecting gilling processes subsequent to carding process and instead incorporating a high draft system while establishing operative connection between the coordinated operation of combers and the operation of a high speed gill.

Still a further object of the invention is to achieve the rationalization of operation by receiving slivers passed through various processes in a can without balling them as in the prior art.

Conventionally, the production of tops in the French worsted spinning system comprises transferring a wool material dried after being washed to a wool bin, feeding the material therefrom into the hopper of an opener, automatically feeding the opened material into the hoppers of a group of cards by means of a conveyor connected to said card hoppers, condensing a group of carded slivers from said cards to form a single sliver, which, after being balled, is passed successively through a first, a second and a third intersecting gill to effect the gilling thereof and then processed on a French comber for combing the same, receiving the thus combed sliver in a can, passing the combed sliver through a fourth gilling thereof, passing it through an after-gill-equipped backwasher in order to backwash, dry and gill the same, followed by balling, and finally processing it on a finish intersecting gill thereby forming a top; thus, the material has to be passed through 7–8 combing and gilling processes after it is carded before a top can be formed.

As described above, in the prior art wool spinning, a wool material has to be passed through several separate machines ranging over 7–8 processes before it can be formed into a top of good quality.

This is because wool fiber, distinct from cotton fiber and chemical or synthetic fiber, has scales and crimps and is stained with oils and fats. Even if the continuous automation of top making is attempted as in cotton spinning system by reducing the number of processes, it is practically impossible to produce a top having the same quality as one produced by the conventional system consisting of many processes.

The greatest difficulty in top making is the problem of achieving the coordinated or interconnected operation of combers and a gill. This problem would not seem to be very serious from a mechanical point of view, but, in fact, many prior attempts and efforts have come to a deadlock concerning the quality of slivers or unevenness in the thickness of slivers so produced.

A cause of the deadlock may be found in the fiber orientation of slivers from the combers. The fiber orientation is such that the front end of each sliver is perpendicular to the longitudinal axis thereof with the slivers lengthwise disposed in partly overlapped relation thus presenting a periodical unevenness in sliver thickness at their overlapped ends. Therefore, the drafting of slivers in such condition would result in sliver breakage and draft unevenness, failing to produce a satisfactory top.

So long as we know and believe, there has been proposed no practical approach to the solution of said problem. In fact, no satisfactory apparatus has even been put into practical use.

So long as we know, in a system for the coordinated operation of combers and a gill, attempts have been made to correct the fiber orientation in an effort to prevent the occurrence of draft unevenness by withdrawing combed slivers in a tilted state. However, such method of correction is still ineffective to eliminate draft unevenness, and there has been obtained no top having the same quality as one produced by the conventional non-continuous combing system.

The next problem is to reduce the number of intersecting gilling processes subsequent to the carding of the material and before the combing thereof. In the prior art, as described above, the material is passed through three intersecting gills, namely the first, second and third intersecting gills and during these gilling processes complex procedures are required for drafting the material and balling the slivers from the respective combers. Therefore, many operators are required, adding to the costs of production.

So long as we know, the above-mentioned problem is not solved, either.

The present invention provides a method and apparatus solving all these problems, succeeding in the continuous automatic production of tops from a wool material conveyed to a wool bin.

As is believed to become apparent from the following description, the invention makes it possible to produce tops of good quality without any unevenness by employing, in particular, a special drafting device in each process and installing a special shuffling device between a comber and a gill.

In the accompanying drawings:

FIG. 10 is an enlarged side view of apron type shuffling means;

FIG. 11 is a plan view of the means shown in FIG. 10;

FIG. 12A illustrates the fiber orientation of slivers delivered from conventional separate or independent combers; and FIG. 12B illustrates a fiber orientation which has been corrected by the present invention.

Figure 1:
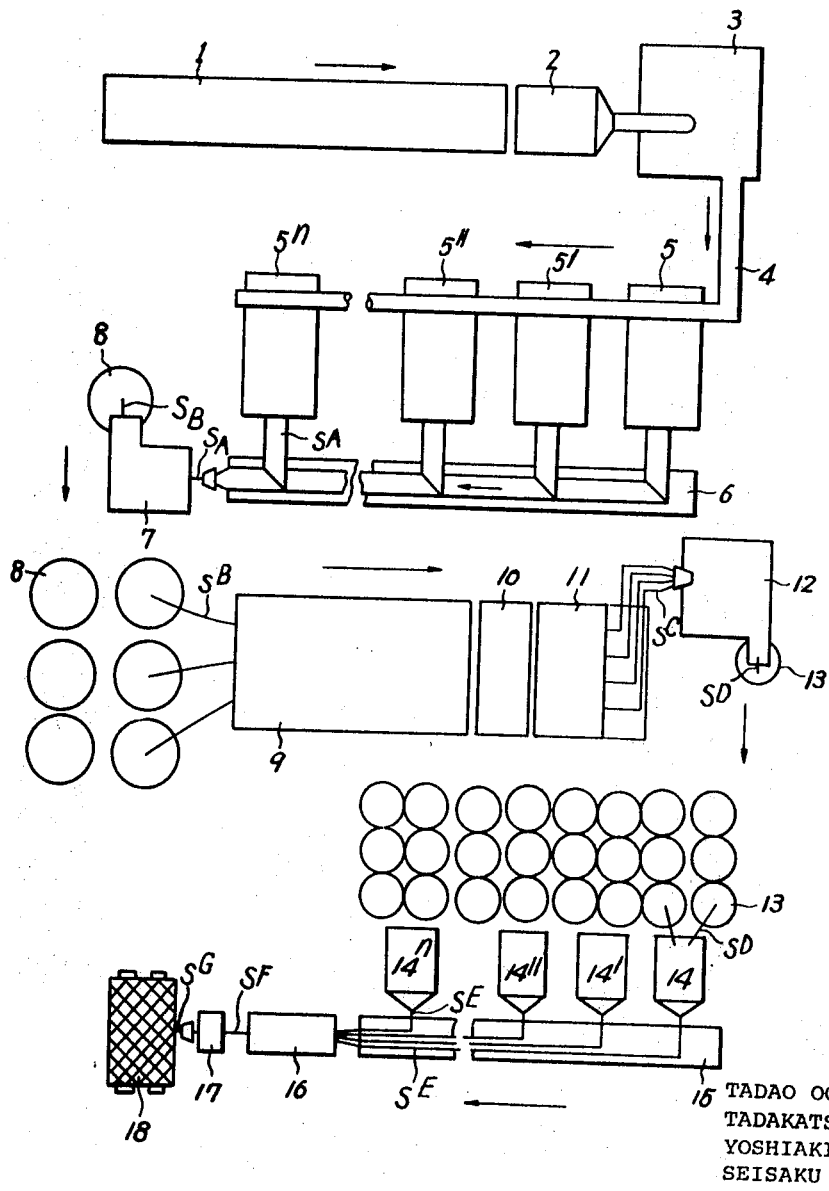
FIG. 1 is an arrangement view showing typical processes for embodying the present method.

In FIG. 1 showing the arrangement of typical processes for embodying the invention, the numeral 1 denotes a wool washing machine for washing wool materials; 2, a dryer for drying washed wool; and 3, a wool bin, which is used for temporarily storing the dried wool material until it is fed into the hoppers of a group of cards 5, 5', 5", . . . 5ⁿ. The numeral 6 denotes a belt conveyor for overlapping slivers $S^A$ delivered from said group of cards and introducing them into first draft means 7 equipped with an automatic can exchanger; and 8, a large-sized can for receiving the sliver $S^B$ drafted by said first draft means. The numeral 9 denotes a backwasher for backwashing the slivers $S^B$ each received in the can 8 in their thus received condition; 10, a dryer for drying the slivers $S^B$ backwashed by the backwasher; 11, a back after-gill for dividing the dried slivers $S^B$ into groups and gilling them; 12, second draft means equipped with an automatic can exchanger for condensing the slivers $S^C$ passed through the back after-gill and re-drafting the same; 13, a can for receiving the sliver $S^D$ delivered from the second draft means; and 14, 14', 14", . . . 14ⁿ, a group of combers whereby the slivers $S^D$ received in the cans 13 are combed group by group, said cans being suitably arranged for this purpose. The numeral 15 denotes a belt conveyor for conveying the slivers $S^E$ delivered from said group of combers 14, 14', 14", . . . 14ⁿ while maintaining their juxtaposed relation as they are delivered from said group of combers; and 16, shuffling means for correcting the fiber orientation of the slivers $S^E$ to enable the slivers to be drafted. The numeral 17 denotes a high speed gill for imparting a gilling draft to the sliver $S^F$ passed through the shuffling means 16; and 18, a top formed by taking up the sliver $S^G$ passed through the high speed gill by a take-up device.

Figure 2:
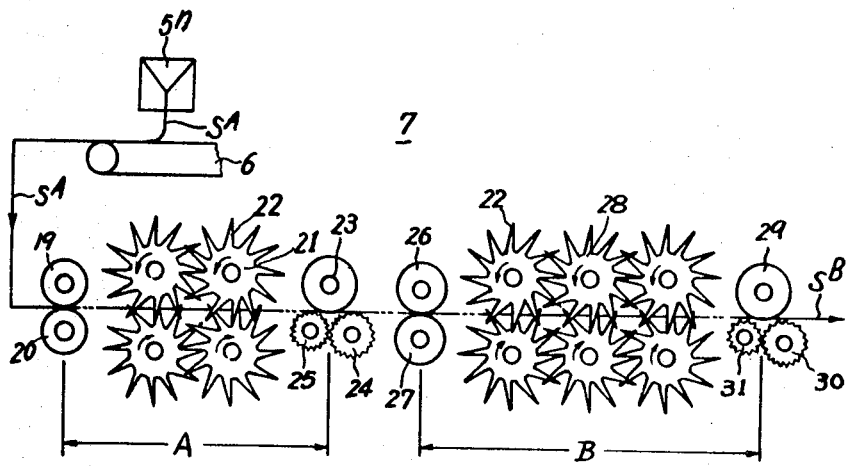
FIG. 2 is a side view showing the principal portion of first draft means connected to a carding process.
Figure 3:
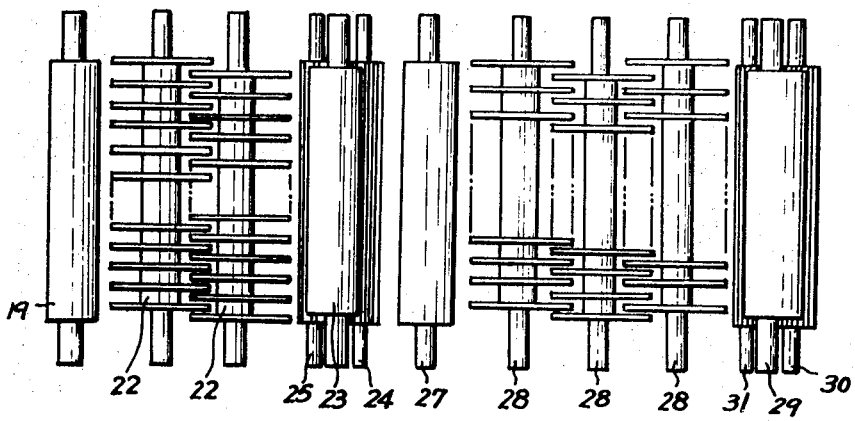
FIG. 3 is a plan view of said principal portion.

FIGS. 2 and 3 show the arrangement of the first draft means. It is of the two-zone system having draft zones A and B. The first draft zone A comprises a back top roller 19, a back bottom roller 20, two pairs of control plate rollers 21 peripherally provided with a number of pointed teeth 22 and rotated in the direction of arrow with each control plate roller disposed in vertically and horizontally partly overlapped relation to adjacent ones, a front top roller 23, a front bottom roller 24 and a front nip roller 25.

The second draft zone B comprises a back top roller 26, a back bottom roller 27, three pairs of control plate rollers 28 peripherally provided with a number of pointed teeth 22 and rotated in the direction of arrow with each control plate roller disposed in vertically and horizontally partly overlapped relation to adjacent ones as in the case of the first draft zone control plate rollers 21, a front top roller 29, a front bottom roller 30 and a nip roller 31.

The first draft means preferably imparts a draft of about 2 in the first draft zone and a draft of about 2–3, totaling a draft of about 4–6; too high a draft would result in damages to the fibers.

Further, the first and second draft zone control plate rollers 21 and 28 preferably have substantially the same peripheral speed, but it is desirable from the viewpoint of prevention of damage to the fibers that the second draft zone control plate rollers 28 have as small a tooth pitch as possible to provide a greater number of teeth than that of the first draft zone control plate rollers 21 by at least 2–3 teeth. It is also desirable from the viewpoint of prevention of formation of floating fibers at the time of drafting that the distance between adjacent shafts respectively of the first and second draft control plate rollers 21 and 28 be as small as possible.

When the slivers $S^A$ delivered from the cards 5, 5', 5", . . . 5ⁿ are passed through the thus arranged first draft means, a first draft is given by the peripheral speed difference between the back top and bottom rollers 19, 20 and the front top and bottom rollers 23, 24 in the first draft zone A and a second draft is given by the peripheral speed difference between the back top and bottom rollers 26, 27 and the front top and bottom rollers 29, 30 in the second draft zone B.

During passage through said first and second draft zones A and B, the slivers $S^A$ are also subjected to gilling by the action of the teeth 22 of the control plate rollers 21 and 28.

Figure 4:
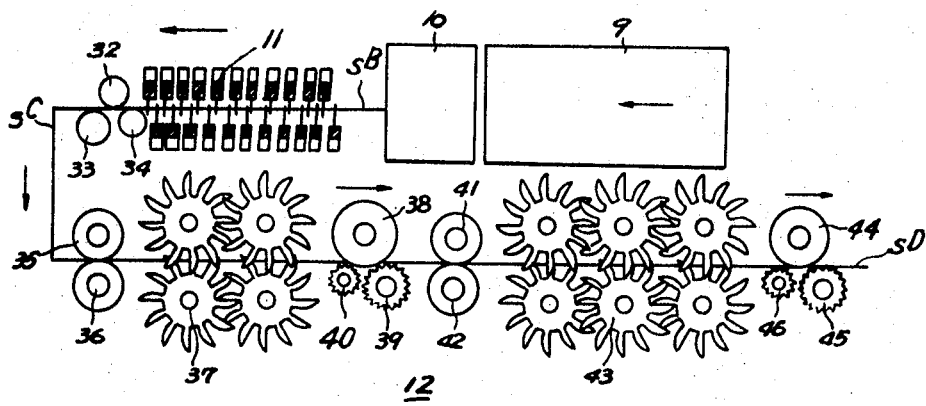
FIG. 4 is a side view showing a connection between a back after-gill and second draft means.

In FIG. 4 showing a connection between the back after-gill 11 and the second draft means 12, the reference numerals 9 and 10 denote said back-washer and dryer, respectively, and the second draft means 12 comprises a first and a second draft zone arranged in the same manner as in the first draft means 7 described above, so that a detailed description of the arrangement thereof may be omitted. In FIG. 4, the reference numeral 32 denotes a back after-gill front toproller; 33, a back after-gill front bottom roller; 34, a back after-gill nip roller; 35, a first draft zone back top roller; 36, a back bottom roller; 37, control plate roller; 38, a front top roller; 39, a front bottom roller; 40, a nip roller; 41, a second draft zone back top roller; 42, a back bottom roller; 43, control plate rollers; 44 a front top roller; 45 a front bottom roller and 46, a nip roller. The slivers $S^B$ passed through the backwasher 9 and delivered from the dryer 10 are passed through the back after-gill 11 to be gilled thereby and the thus gilled slivers $S^C$ are led into the second draft means 12, where the slivers $S^C$ are subjected again to gilling and then received in a can 13.

Figure 5:
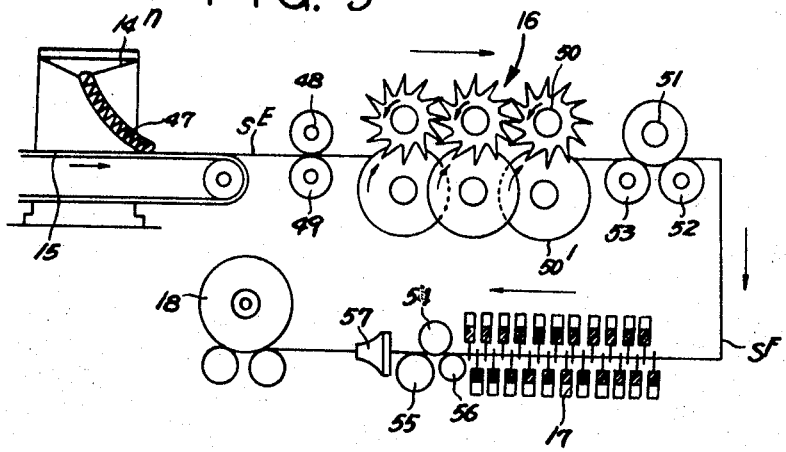
FIGS. 5–7 are side views showing embodiments for interconnecting a comber, shuffling means and high speed gill.
Figure 6:
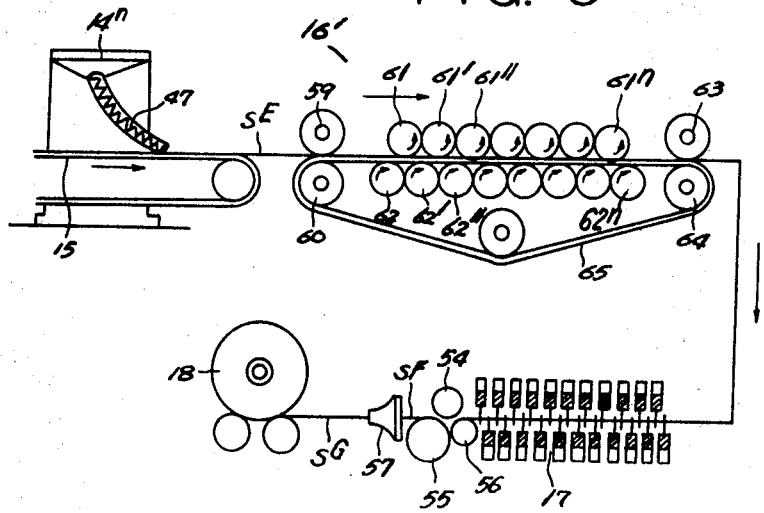
Figure 7:
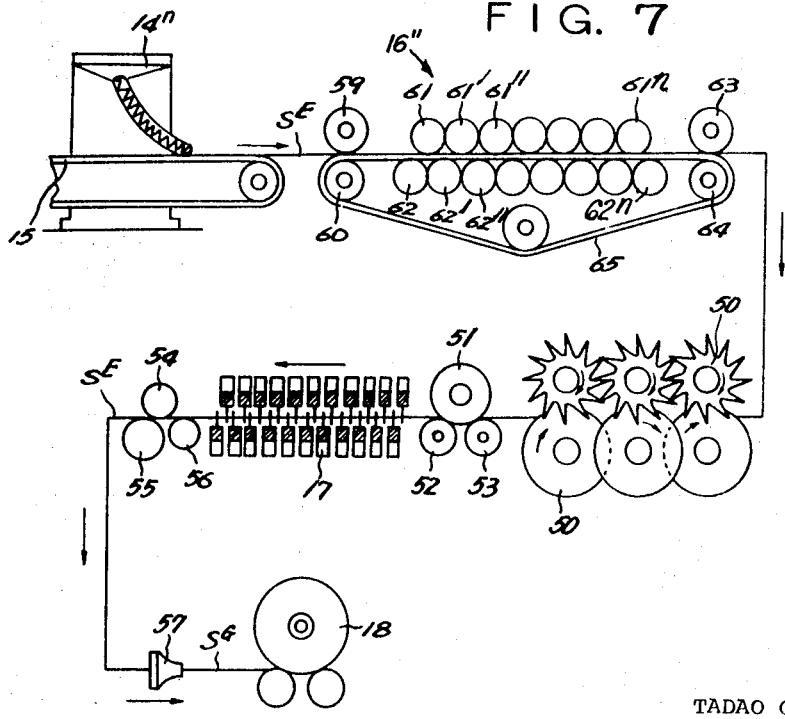
Figure 8:
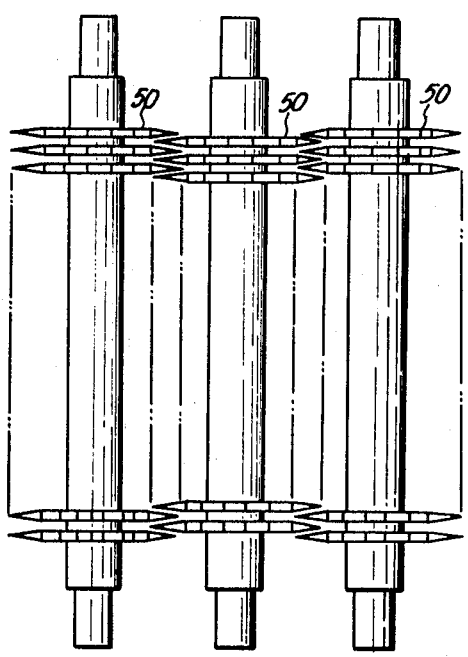
FIG. 8 is an enlarged plan view of control plate.

FIGS. 5, 6 and 7 show three embodiments for establishing connection between the shuffling means and the high speed gill. In FIG. 5 showing one embodiment, the reference numeral 16 denotes the shuffling means; 17, the high speed gill; 14ⁿ, the comber; 15, the belt conveyor for conveying the slivers $S^E$ delivered from the combers; and 47, a reserve tube for reserving the sliver $S^E$ delivered from the combers.

Figure 9:
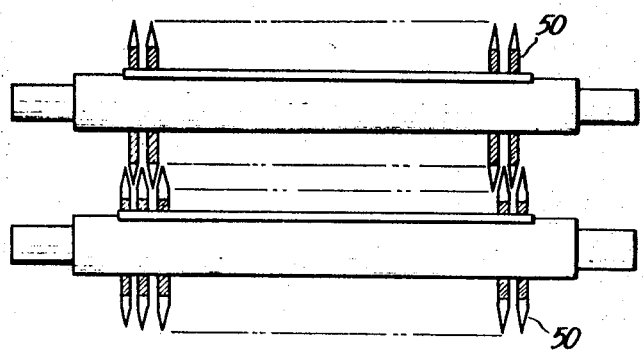
FIG. 9 is an elevation of said control plate rollers.

The shuffling means 16 comprises three upper control plate rollers 50 provided with a number of pointed teeth and three lower plate rollers 50' having no teeth but instead having a pointed edge (see FIG. 9), said rollers 50 and 50' being disposed in vertically and horizontally partly overlapped relation to adjacent ones, the lower plate rollers 50' being rotated at the same peripheral speed in the direction of arrow, the respective peripheral speeds of the upper control plate rollers 50 being gradually increased in the direction of travel of slivers.

The peripheral speed differences may be optionally selected in accordance with the draft ratio. However, assuming that a draft of 1.42 is to be imparted, it is desirable that the peripheral speeds of the three rollers 50 be gradually increased to provide a peripheral speed ratio of 1:1.2:1.4, whereby the fiber orientation of the slivers from the combers is corrected so that the sliver can be drafted without giving rise to unevenness in thickness.

As shown in FIG. 12A, the fiber orientation of slivers delivered from combers is usually such that the front end of each sliver that was nipped by a nipper is perpendicular to the longitudinal axis thereof so that, needless to say, such slivers, as partly overlapped one upon another at regular intervals of space, are ununiform in thickness. If slivers having such fiber orientation are drafted by being passed directly through a gill, this will result in draft unevenness and/or sliver breakage.

In the prior art, as a measure for correction to obtain an improved fiber orientation shown in FIG. 12B, several slivers are doubled and then drafted several times by being passed through intersecting gills. Further, in the case where several combers are interconnected, it has also been attempted to obliquely draw slivers delivered from the combers in an effort to correct the fiber orientation. However, when a group of combers are operated in a coordinated manner, draft unevenness has still occurred and hence tops of good quality have not been obtained yet. It is possible to correct the fiber orientation shown in FIG. 12A into an improved state as shown in FIG. 12B by passing slivers through said shuffling means 16. Further, the fibers are subjected to gilling by the upper control plate rollers 50 and lower plate rollers 50' and at the same time they are drafted by the peripheral speed difference between the back top roller 48 and the front top roller 51. The sliver $S^F$ is then fed into the high speed gill 17 where it is gilled, during which it is drafted between the back top roller 51 and the front top roller 54 of the high speed gill 17 and delivered as the sliver $S^G$. The sliver $S^F$ is condensed by a trumpet 57 and formed into a top 18 by a take up device. In FIG. 5, the numeral 49 denotes a back bottom roller; 53, a nip roller; 55, a front bottom roller; and 56, a nip roller.

FIG. 6 shows apron type shuffling means 16' comprising a number of top shuffling rollers 61, 61', 61'', ... $61^n$ (which may be fluted rollers, knurled rollers, saw tooth rollers or the like) disposed on the horizontal plane of an endless apron 65 extended around a back bottom roller 60 and a front bottom roller 64, and bottom shuffling rollers 62, 62', 62'', ... $62^n$ (which may be smooth-surfaced rollers, fluted rollers, knurled rollers, saw tooth rollers or the like) disposed under the endless apron 65, the top shuffling rollers 61, 61', 61'', ... $61^n$ being rotated in the direction of the arrow at about 10–15% slower peripheral speed than the bottom shuffling rollers 62, 62', 62'', ... $62^n$ rotating at the same speed in the direction of arrow.

The slivers $S^E$ passing through the thus arranged shuffling means 16' are drafted between the front and back top rollers 63 and 59 by the peripheral speed difference therebetween to have their fiber orientation corrected into the improved state shown in FIG. 12B and are then passed through a high speed gill 17 to form a top 18.

FIG. 7 shows still another form of shuffling means 16'' which is a combination of the apron type shuffling means described with reference to FIG. 6 and the plate type roller shuffling means described with reference to FIG. 5.

If this combination shuffling means is used, the fibers constituting the slivers $S^E$, while passing through the apron type shuffling means, are lengthwise shuffled to have their fiber orientation corrected and while passing through the plate type shuffling means, they are widthwise shuffled while they are gilled by the high speed gill 17 and then collected by a trumpet 57 to be formed into a top 18 as in the shuffling means 16 and 16'.

As described above, the present invention makes it possible to abolish the conventional first, second and third intersecting gills by high-drafting slivers delivered from cards by employing a two-zone system using special draft means having members with pointed teeth disposed in vertically and horizontally partly overlapped relation, and is so arranged that slivers delivered from cards are passed through a back after-gill-equipped backwasher for rewashing, through second draft means similar to said first draft means to effect high draft and then received in a can, such slivers received in cans being processed on combers in a coordinated operation system.

Before the combed slivers are passed through a high speed gill for finish gilling, they are passed through an apron type or plate roller type shuffling means or a combination type shuffling means consisting of both types to correct the fiber orientation into an improved state and then drafted. As a result, the fibers are further parallelized and subjected to gilling by the high speed gill, so that the slivers formed into top are of very good quality with improved parallelism of fibers having no substantial unevenness in thickness.

If unevenness adjusting means is added to the final gilling process, tops of better quality would be obtained, but it is not essential.

As is apparent from the preceding description, the invention aims at a great reduction in the number of processes in the conventional top-making system and is capable of producing tops of as good quality as ever with higher efficiency. The invention is very useful in that it makes it possible to realize a continuous automatic system for worsted spinning. Further, the invention reduces the number of operators and achieves the rationalization of machines, thus greatly reducing the manufacturing costs of tops.

What is claimed is:

1. A method of producing worsted tops comprising the steps of washing, drying and storing a wool material in a wool bin; conveying said wool material from said wool bin to cards, carding said wool material and forming carded slivers; conveying said carded slivers to a first draft means, drafting said carded slivers and forming a drafted sliver; backwashing and drying a plurality of said drafted slivers; gilling said plurality of slivers by a back after-gill; conveying a plurality of gilled slivers to a second draft means, drafting said plurality of gilled slivers and forming a twice drafted sliver; conveying a plurality of said twice drafted slivers to combers, combing said plurality of twice drafted slivers and forming a combed sliver; conveying a plurality of combed slivers to a shuffling means, shuffling said combed slivers and forming a shuffled sliver; and gilling said shuffled sliver by a high speed gill.

References Cited

UNITED STATES PATENTS

| 1,672,527 | 6/1928 | Heintze | 19—66 R |
| 1,939,525 | 12/1933 | Schmitt | 19—65 R |
| 2,964,802 | 12/1960 | Aono et al. | 19—98 X |
| 3,104,426 | 9/1963 | Wellman | 19—65 R X |

FOREIGN PATENTS

| 479,227 | 2/1938 | Great Britain | 19—66 R |
| 492,797 | 9/1938 | Great Britain | 19—65 A |
| 616,815 | 1/1949 | Great Britain | 19—65 R |

DORSEY NEWTON, Primary Examiner

U.S. Cl. X.R.

19—65 A